(12) United States Patent
Ouyang et al.

(10) Patent No.: US 11,099,060 B2
(45) Date of Patent: Aug. 24, 2021

(54) METAL-INSULATOR-METAL HIGH-SENSITIVITY SURFACE PLASMON POLARITON TERAHERTZ WAVE DETECTOR

(71) Applicant: Shenzhen University, Guangdong (CN)

(72) Inventors: Zhengbiao Ouyang, Guangdong (CN); Zhiliang Chen, Guangdong (CN)

(73) Assignee: Shenzhen University, Shenzhen (CN)

(*) Notice: Subject to any disclaimer, the term of this patent is extended or adjusted under 35 U.S.C. 154(b) by 285 days.

(21) Appl. No.: 16/485,015

(22) PCT Filed: Nov. 21, 2016

(86) PCT No.: PCT/CN2016/106593
§ 371 (c)(1),
(2) Date: Aug. 9, 2019

(87) PCT Pub. No.: WO2017/140136
PCT Pub. Date: Aug. 24, 2017

(65) Prior Publication Data
US 2020/0041334 A1   Feb. 6, 2020

(30) Foreign Application Priority Data
Feb. 15, 2016  (CN) .......................... 201610085878.9

(51) Int. Cl.
*G01J 1/02* (2006.01)
*G01J 1/42* (2006.01)

(52) U.S. Cl.
CPC ............... *G01J 1/0209* (2013.01); *G01J 1/42* (2013.01)

(58) Field of Classification Search
CPC .................................. G01J 1/0209; G01J 1/42
See application file for complete search history.

(56) References Cited

U.S. PATENT DOCUMENTS

2015/0068599 A1* 3/2015 Chou ................... C23C 14/046
136/257

FOREIGN PATENT DOCUMENTS

| CN | 101038213 A | 9/2007 |
|---|---|---|
| CN | 103398776 A | 11/2013 |
| CN | 103855228 A | 6/2014 |
| CN | 203760501 U | 8/2014 |

(Continued)

OTHER PUBLICATIONS

International Preliminary Report on Patentability for International Application No. PCT/CN2016/106593, dated Aug. 28, 2018, 5 pages.

(Continued)

*Primary Examiner* — Hugh Maupin
(74) *Attorney, Agent, or Firm* — Hongyu Wang

(57) ABSTRACT

A metal-insulator-metal (MIM) high-sensitivity plasmon polariton (SPP) terahertz wave detector includes a rectangular cavity, an absorption cavity, a silver block, two waveguides, three metal films, a terahertz probe light, a signal light, and an opto-electric detector; the terahertz probe light is located at an upper end of the rectangular cavity; the rectangular cavity is located at an input end of the terahertz probe wave; and the absorption cavity is connected with a first waveguide; the silver block is disposed within the first waveguide, and is movable; and the first waveguide is connected with a second waveguide.

14 Claims, 9 Drawing Sheets

(56) References Cited

FOREIGN PATENT DOCUMENTS

| | | |
|---|---|---|
| CN | 104048768 A | 9/2014 |
| CN | 204116640 U | 1/2015 |
| CN | 104916732 A | 9/2015 |
| CN | 105070996 A | 11/2015 |
| CN | 105572797 A | 5/2016 |
| CN | 105572798 A | 5/2016 |
| CN | 105737975 A | 7/2016 |
| WO | 2014114447 A1 | 7/2014 |

OTHER PUBLICATIONS

Written Opinion for PCT Application No. PCT/CN2016/106593, dated Feb. 16, 2017, 4 pages.
International Search Report for PCT Application No. PCT/CN2016/106593, dated Feb. 23, 2017, 5 pages.

* cited by examiner

METAL-INSULATOR-METAL HIGH-SENSITIVITY SURFACE PLASMON POLARITON TERAHERTZ WAVE DETECTOR

CROSS-REFERENCE TO RELATED APPLICATIONS

This application is a Continuation of Application No. PCT/CN2016/106593, filed on Nov. 21, 2016, and claims priority to Chinese Patent Application No. 201610085878.9, filed on Feb. 15, 2016. The content of the aforementioned applications are hereby incorporated by reference in their entireties.

TECHNICAL FIELD

The present disclosure is related to a metal-insulator-metal high-sensitivity plasmon polariton terahertz wave detector.

BACKGROUND

In recent years, people have made great progress in the study in various bands of the electromagnetic spectrum. However, in the terahertz band (0.1 THz-10 THz), research is still in the primary stage. Terahertz waves exist everywhere around us, but technical problems in high-efficiency, miniature terahertz-wave detectors, terahertz sources, and so on are the major obstacles for studying and using this band.

The waveguide based on surface plasmon polariton (SPP) can break through the diffraction limit and realize optical information processing and transmission on the nanometer scale. Surface plasmon polaritons (SPPs) are surface electromagnetic waves that propagate on the surface of a metal when an electromagnetic wave is incident on the interface between the metal and a medium. According to the nature of the SPPs, many devices based on simple SPP structures have been proposed, such as filters, circulators, logic gates, and optical switches. These devices are relatively simple in structure and very convenient for optical circuit integration.

Progress has been made in the study of terahertz wave detectors such as thermal effect detectors, thermistor detectors, liquid-cooled silicon (Si), or Germanium (Ge) thermal-radiation-measuring instruments, superconductor frequency-mixing techniques, and thermal-electron radiation radiometer based on the cooling mechanism by the use of phonons and electron scattering. These technologies can detect the strength of a terahertz wave. Frequency-domain terahertz time-domain spectroscopy, which uses coherent electromagnetic pulses with frequencies between far-infrared and microwaves as probing sources, and directly records amplitude time waveforms of terahertz radiation fields using photoconductive sampling or free-space electro-optic sampling, can be measured. From the amplitude time waveforms of the terahertz wave, both amplitude and phase information is obtained. Although these technologies have their own merits, they are all too large in size, require harsh working environment, and are expensive, which does not favor practical applications.

SUMMARY

The object of the present disclosure is to overcome the deficiencies of the prior art and to provide a high sensitivity SPP terahertz detector that facilitates an integrated MIM structure. The object of the present disclosure is achieved by the following technical solutions.

A metal-insulator-metal (MIM) high-sensitivity plasmon polariton (SPP) terahertz wave detector includes a rectangular cavity, an absorption cavity, a silver block, two waveguides, three metal films, and a terahertz probe light, a signal light and an opto-electric detector; the terahertz probe light is located at an upper end of the rectangular cavity; the rectangular cavity is located at an input end of the terahertz probe wave; the absorption cavity is connected with a first waveguide; the silver block (Ag Block) is disposed within the first waveguide, and is movable; and the first waveguide is connected with a second waveguide.

A shape of the absorption cavity is a rectangle, a circle, a polygon, an ellipse, a combination of a rectangle and a circle, a combination of a rectangle and a polygon, a combination of a rectangles with ellipses, a combination of a circles and a polygons, a combination of a circles and an ellipses, or a combination of a polygons and an ellipses.

Inside the rectangular cavity is a high transmittance material.

Inside the rectangular cavity is silicon (Si), germanium, or gallium arsenide.

Inside the absorption cavity is a high thermal-expansion-coefficient material.

Inside the absorption cavity is ethanol, or mercury.

The MIM forms a waveguide structure.

The first waveguide and the second waveguide are waveguides of a MIM structure.

The metal is gold, or silver; and the metal is silver.

The insulator is a transparent material; and the insulator is air, silicon dioxide, or Si.

The signal light has an operating wavelength of 780 nm, the terahertz probe wave has a wavelength of 3 μm, and has a strength of 1.2 nW to 4.2 nW.

The opto-electric detector is located at an output port of the second waveguide; and the opto-electric detector is made of Si.

The beneficial effects of the present disclosure are:

The terahertz wave detector is compact in structure, small in size, and very easy to integrate. The terahertz wave detector has a high in sensitivity, and terahertz detection sensitivity to nW magnitude.

These and other objects and advantages of the present disclosure will become readily apparent to those skilled in the art upon reading the following detailed description and claims and by referring to the accompanying drawings.

DETAILED DESCRIPTION OF THE DRAWINGS

The present disclosure is more specifically described in the following paragraphs by reference to the drawings attached only by way of example.

DETAILED DESCRIPTION

The terms a or an, as used herein, are defined as one or more than one. The term plurality, as used herein, is defined as two or more than two. The term another, as used herein, is defined as at least a second or more.

Figure 1:
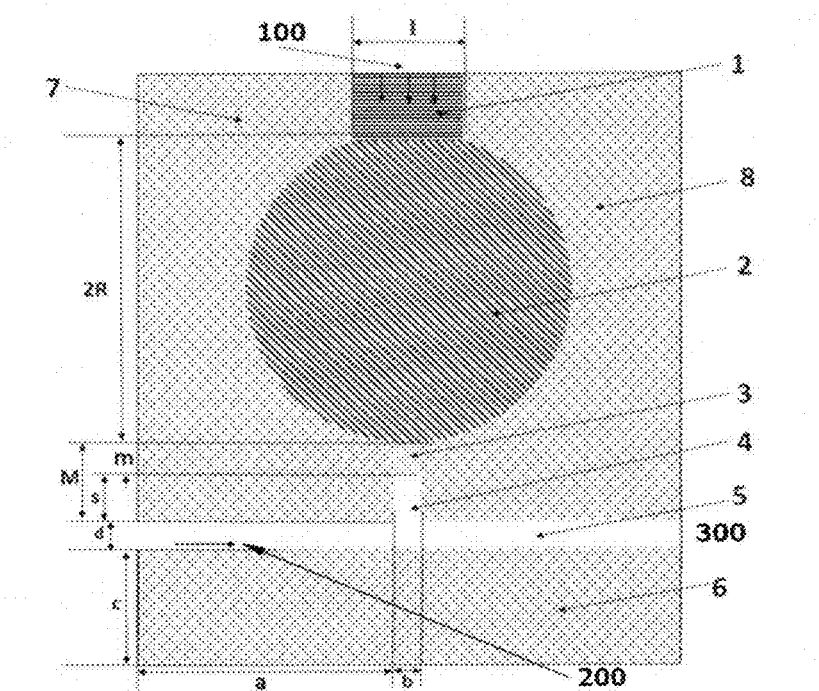
FIG. 1 shows a schematic diagram of a two-dimensional structure of a terahertz detector in embodiment 1.
Figure 2:
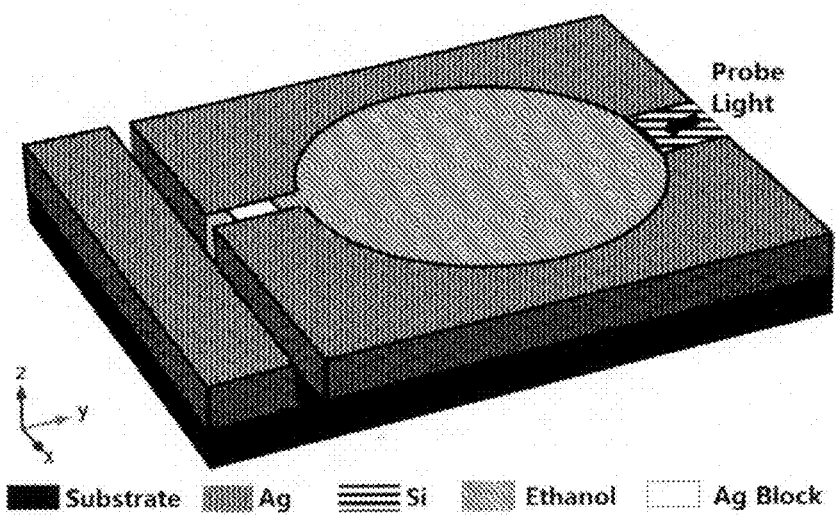
FIG. 2 shows a schematic view of a three-dimensional structure shown in FIG. 1.

In accordance with one or more embodiments of the present disclosure as shown in FIGS. 1 and 2 (the package medium above the structure is omitted in FIG. 2), the metal-insulator-metal (MIM) high-sensitivity surface plasmon polariton (SPP) terahertz wave detector includes a rectangular cavity 1, an absorption cavity (or a terahertz wave absorption cavity) 2, a silver block (or AG Block) 3, and a first waveguide (or a vertical waveguide) 4, a second waveguide (or a horizontal waveguide) 5, metal films 6, 7 and 8, a terahertz probe light (or a terahertz probe wave) 100, a signal light (or a horizontally propagating signal light, i.e., SPP) 200 and an opto-electric detector 300; the rectangular cavity 1 is located at the input end of the terahertz probe wave 100, the width l of the rectangular cavity 1 is 175 nm, and a range of l is 150 to 500 nm; inside the rectangular cavity 1 is a high transmittance material, and is silicon, germanium, or gallium arsenide; the rectangular cavity 1 use silicon; the absorption chamber 2 is connected with the first waveguide 4, the absorption chamber 2 uses a circular cavity, and its radius is R, and the material inside the absorption cavity 2 has a high absorption coefficient with high thermal-expansion-coefficient; the high thermal-expansion-coefficient material in the absorption cavity 2 uses ethanol; the silver block 3 is arranged in the first waveguide 4, the silver block 3 is movable, the length m of the silver block 3 is 125 nm, and the range of m is 80 to 150 nm; the silver block 3 is gold, or silver, and is silver; the space length of air segment between the silver block 3 and the second waveguide 5 is s, and the range of s is 0 to 150 nm, which is determined by the position of the silver block 3; the silver block 3 is to move towards the second waveguide 5 to change the space length of air segment between the silver block 3 and the second waveguide 5 inside the first waveguide 4, thus changing the transmission of signal light 200; the output power of the signal light 200 corresponds to the power of the input terahertz probe wave 100. The first waveguide 4 and the second waveguide 5 are waveguides of a MIM structure, and the MIM forms a waveguide structure; the first waveguide 4 is connected with the second waveguide 5, and the first waveguide 4 is located at the upper end of the second waveguide 5; the medium in the second waveguide 5 is air, the width d of the second waveguide 5 is 50 nm, and the range of d is 30 to 100 nm; the distance from the lower edge of the second waveguide 5 to the edge of the metal film 6 is c, and c is greater than 150 nm; the width b of the first waveguide 4 is 35 nm, and the range of b is 30 to 60 nm; the length M of the first waveguide 4 is 250 nm, and the rang of the length M is over 200 nm. The distance a from the left edge of the first waveguide 4 to the left edge of the metal film 7 is 400 nm, and the range of a is 350 to 450 nm; the terahertz probe wave 100 is located at the upper end of the rectangular cavity 1; the opto-electric detector 300 uses silicon (Si) material, which is located at the output port of the second waveguide 5. The terahertz probewave 100 heats the ethanol in the absorption cavity 2, and the ethanol expands to push the silver block 3 to move towards the second waveguide 5 to change the space length of air segment between the silver block 3 and the second waveguide 5 inside the first waveguide 4, thus changing the transmission of signal light 200, and finally the intensity of the terahertz probe wave 100 is transmitted to the signal light 200. The wavelength of the signal light 200 is 780 nm, the wavelength of the terahertz probe wave 100 is 3 μm, the direction of the terahertz probe wave 100 is parallel to the vertical waveguide axis and perpendicular to the horizontal waveguide axis, or parallel to the horizontal waveguide axis and perpendicular to the vertical waveguide axis, or perpendicular to the vertical waveguide axis and perpendicular to horizontal waveguide axis. The transmittance of the signal light 200 is obtained in accordance with the light intensity of the signal light 200 detected by the opto-electric detector 300 (e.g., silicon opto-electric detector), and the light intensity of the terahertz probe light 100 is obtained in accordance with the relationship between the transmittance and the intensity of the terahertz probe light 100 detection light. When the terahertz probe wave 100 disappears, the absorption cavity 2 will disappear, then under the action of the external atmospheric pressure, the silver block 3 will return to its original equilibrium position where the initial pressure is balanced to facilitate the next detection.

The absorption of terahertz probe wave 100 by ethanol in the absorption cavity 2 follows Beer-lambert's law, and the absorption coefficient is defined as follows: a monochromatic laser light having an intensity of $I_0$ and a frequency of μ passes through the absorption medium of length l, after exiting the light intensity is I:

$$I=I_0 e^{-\kappa l}$$

Then κ is defined as the absorption coefficient. The formula shows that the absorption of terahertz probe wave 100 energy by ethanol solution is related to the length of light path in the ethanol medium. In order to make the energy of the terahertz probe wave 100 absorbed by ethanol as large as possible, the length of the terahertz probe wave 100 light path must be increased. The irradiation distance within the ethanol finally determines the incident port of the terahertz probe wave 100 at the upper end of the rectangular cavity 1. When the terahertz probe wave 100 is incident on the ethanol region, the ethanol absorbs the energy of the terahertz probe wave 100, the temperature of ethanol rises and the volume of ethanol becomes larger, and then the silver block 3 moves to change the transmittance of the signal light 200.

The specific heat capacity of ethanol is $C=2.4 \times 10^3$ J/kg·°C., the volume expansion coefficient is $\alpha_{ethanol}=1.1 \times 10^{-3}$/°C., and the density is $\rho=0.789$ g/cm$^3$ at room temperature (20° C.). The linear expansion coefficient of silver block 3 is $\alpha_{Ag}=19.5\times10^{-6}/°$ C. Compared with the expansion coefficient of ethanol, the expansion of silver block 3 is negligible under the same temperature change.

Figure 3:
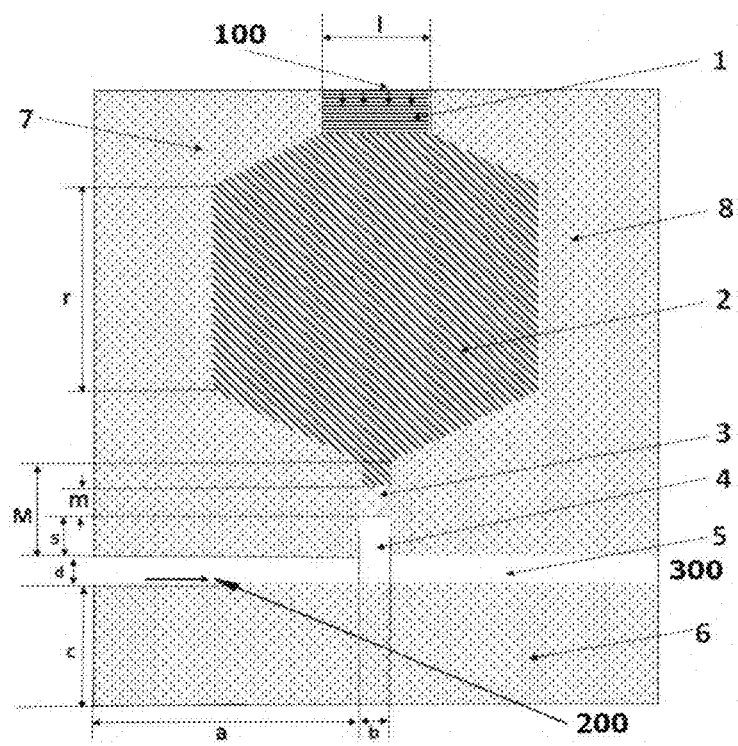
FIG. 3 shows a schematic diagram of a two-dimensional structure of a terahertz detector in embodiment 2.
Figure 4:
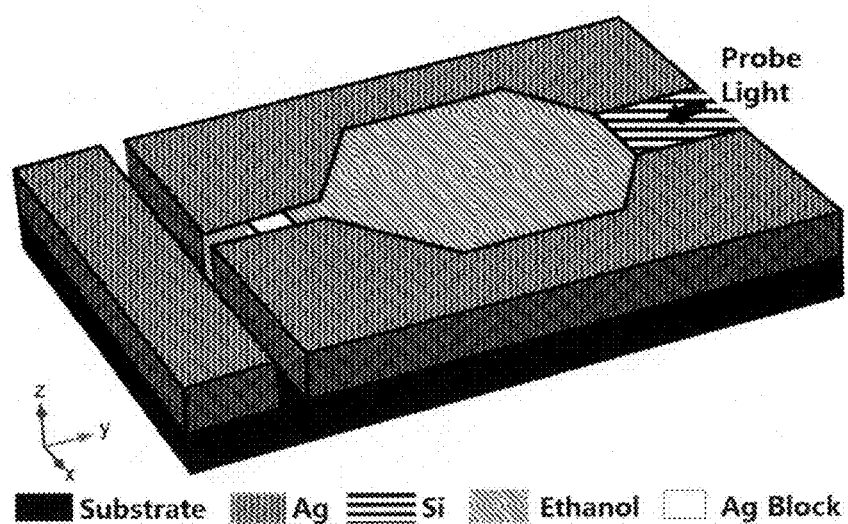
FIG. 4 shows a schematic diagram of the three-dimensional structure shown in FIG. 3.

In accordance with one or more embodiments of the present disclosure, as shown in FIGS. 3 and 4 (the package medium above the structure is omitted in FIG. 4), the metal-insulator-metal (MIM) high-sensitivity surface plasmon polariton (SPP) terahertz wave detector includes a rectangular cavity 1, an absorption cavity (or a terahertz wave absorption cavity) 2, a silver block (or Ag Block) 3, and a first waveguide (or a vertical waveguide) 4, a second waveguide (or a horizontal waveguide) 5, metal films 6, 7 and 8, a terahertz probe light (or a terahertz wave) 100, a signal light (or a horizontally propagating signal light, i.e., SPP) 200, and an opto-electric detector 300; rectangular cavity 1 is located at the input end of the terahertz probe wave 100 and has a width 1 of 175 nm, and a range of l is 15 to 500 nm. Inside the rectangular cavity 1 is a high transmittance material, and is silicon, germanium or gallium arsenide; the rectangular cavity 1 uses silicon; the absorption cavity 2 is connected with the first waveguide 4, the absorption cavity 2 is a regular hexagonal cavity, and the side length is r, the cross-sectional area of the absorption cavity 2 is 502655 nm$^2$, and the material used in the absorption cavity 2 has a high absorption coefficient with high thermal-expansion-coefficient; and the high thermal-expansion-coefficient material in the absorption cavity 2 is ethanol; the silver block 3 is disposed in the first waveguide 4, and is movable, the length m of the silver block 3 is 125 nm, the range of m is 80 to 150 nm, the silver block 3 is gold, or silver, and is silver; the space length of air segment between the silver block 3 and the second waveguide 5 is s, and the range of s is 0 to 150 nm, which is determined by the position of the silver block 3; the silver block 3 is to move towards the second waveguide 5 to change the space length of air segment between the silver block 3 and the second waveguide 5 inside the first waveguide 4, thus changing the transmission of signal light 200; the output power of the signal light 200 corresponds to the power of the input terahertz probe wave 100. The first waveguide 4 and the second waveguide 5 are waveguides of a MIM structure. The first waveguide 4 is connected with the second waveguide 5, and the first waveguide 4 is located at the upper end of the second waveguide 5; the medium in the second waveguide 5 is air, the width d of the second waveguide 5 is 50 nm, and the range of d is 30 to 100 nm; the distance from the lower edge of the second waveguide 5 to the edge of the metal film 6 is c, and c is greater than 150 nm; the first waveguide 4 has a width b of 35 nm, and the rang of b is 30 to 60 nm; the length M of the first waveguide 4 is 250 nm, and the rang of the length M is over 200 nm. The distance a from the left edge of the first waveguide 4 to the left edge of the metal film 7 is 400 nm, and the range of a is 350 to 450 nm; the terahertz probe light 100 is located at the upper end of the rectangular cavity 1; the opto-electric detector 300 uses silicon (Si) material, which is located at the output port of the second waveguide 5.

Figure 5:
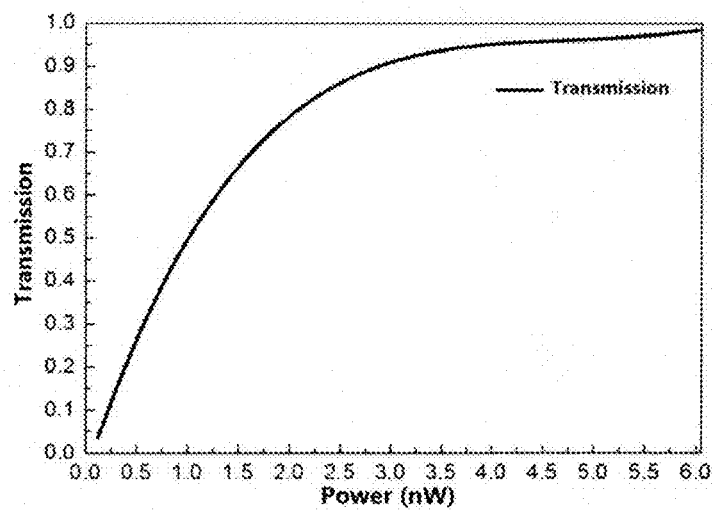
FIG. 5 shows a graph between a signal light transmittance and a terahertz wave input power.

The terahertz probe wave 100 heats the ethanol in the absorption cavity 2, and the ethanol expands to push the silver block 3 to move towards the second waveguide 5 to change the space length of air segment between the silver block 3 and the second waveguide 5 inside the first waveguide 4, thus changing the transmission of signal light 200, and finally the intensity of the terahertz probe wave 100 is transmitted to the signal light 200. The wavelength of the signal light 200 is 780 nm, the wavelength of the terahertz probe wave 100 is 3 μm, and the direction of the terahertz probe wave 100 is parallel to the vertical waveguide axis and perpendicular to the horizontal waveguide axis, or parallel to the horizontal waveguide axis and perpendicular to the vertical waveguide the axis, or perpendicular to the vertical waveguide axis and perpendicular to the horizontal waveguide axis. The transmittance of the signal light 200 is obtained in accordance with the light intensity detected by the opto-electric detector 300 (e.g., silicon opto-electric detector), and the light intensity of the terahertz probe light 100 may be obtained based on the relationship between the transmittance and the terahertz probe light 100 detection light. When the terahertz probe wave 100 is stopped input into the absorption chamber 2, under the action of the external atmospheric pressure, the silver block 3 will return to its equilibrium position where the initial pressure is balanced, to facilitate the next detection. In accordance with the parameters of the ethanol and the parameters of the structure, the relationship between the transmittance of the signal light 200 and the input power of the terahertz probe wave 100 is a simulated and calculated. As shown in FIG. 5, the time for the terahertz probe wave 100 to enter the absorption cavity 2 is set to 1 ms (e.g., the heating time for the material by the terahertz probe wave 100 in the absorption chamber 2 is 1 ms). For the shape of the absorption cavity 2 includes a circular cavity and a polygonal cavity, since the terahertz probe wave 100 is reflected multiple times in the absorption cavity 2, we can consider that the ethanol in it absorbs the wave completely. In accordance with the volt-ampere characteristic of the opto-electric detector 300, the intensity of the signal light 200 is obtained, and in combination with the relationship between the output intensity of the signal light 200 and the terahertz probe wave intensity, the intensity of the terahertz probe wave 100 is finally obtained. When the terahertz detector absorbs terahertz light 100 in the absorption chamber 2 for 1 ms, the detection intensity range of the terahertz probe wave 100 is 0.6 to 6 nW; the terahertz detector can change the detection intensity by changing the absorption time in the absorption chamber 2, to broaden the range of detection intensity. Terahertz detector absorbs the terahertz wave in the absorption cavity 2 for the time gms, and the terahertz detection intensity range is (0.6/g) to (6/g) nW, wherein g is a ratio coefficient not less than 1.

Figure 6:
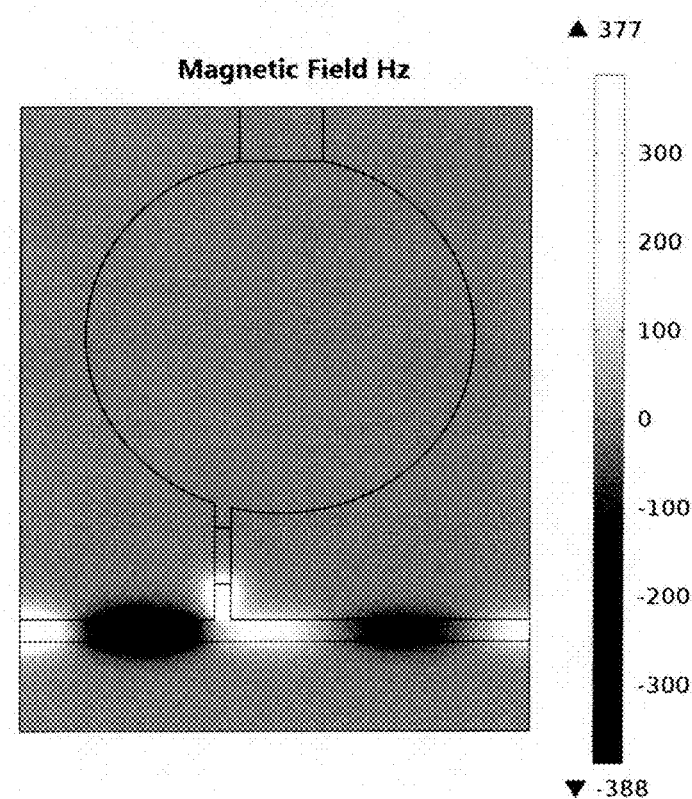
FIG. 6 shows a signal light-field distribution diagram of a terahertz wave input power of 1.2 nW in embodiment 1.

In at least embodiment 1, the incident terahertz intensity is 1.2 nW; using the structures in FIGS. 1 and 2, the two-dimensional (2D) structure is numerically verified and numerical simulations is obtain for the light field distribution shown in FIG. 6.

Figure 7:
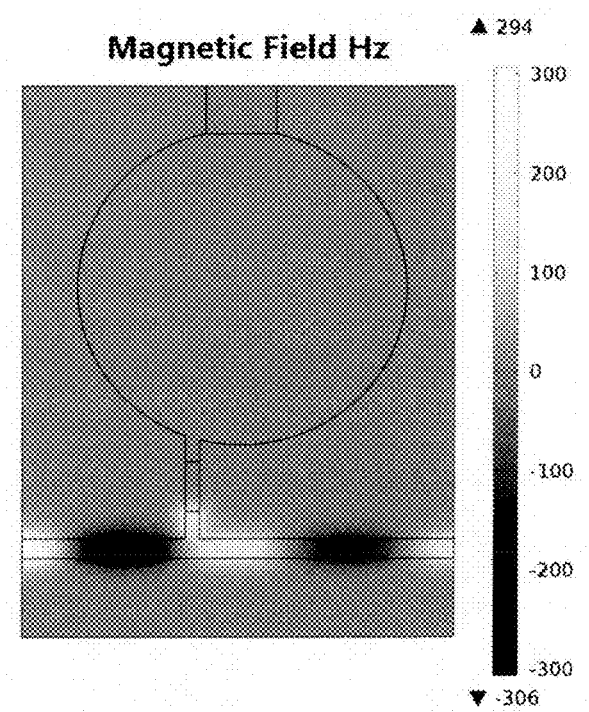
FIG. 7 shows a signal light-field distribution diagram of a terahertz wave input power of 1.8 nW in embodiment 1.

In at least embodiment 2, the incident terahertz intensity is 1.8 nW; using the structures of FIGS. 1 and 2, the 2D structure is numerically verified and numerical simulations is obtain for the light field distribution shown in FIG. 7.

Figure 8:
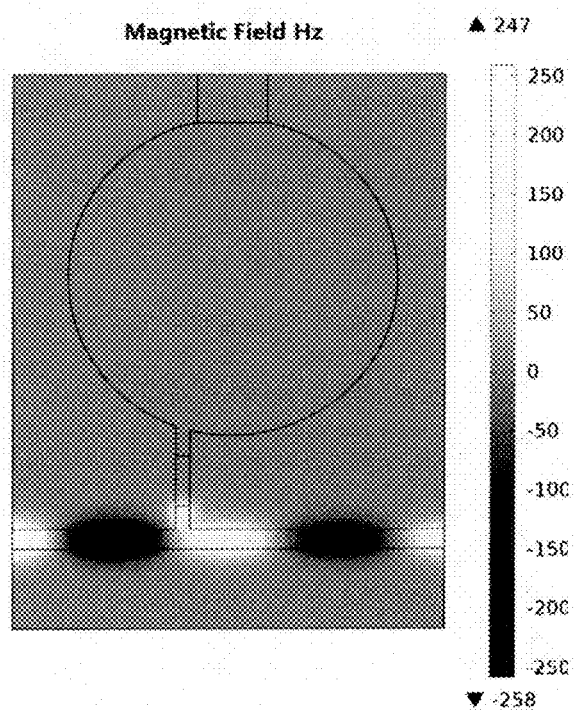
FIG. 8 shows a signal light-field distribution diagram of a terahertz wave input power of 2.4 nW in embodiment 1.

In at least embodiment 3, the incident terahertz intensity is 2.4 nW; using the structures of FIGS. 1 and 2, the 2D structure is numerically verified and numerical simulations is obtain for the light field distribution shown in FIG. 8.

Figure 9:
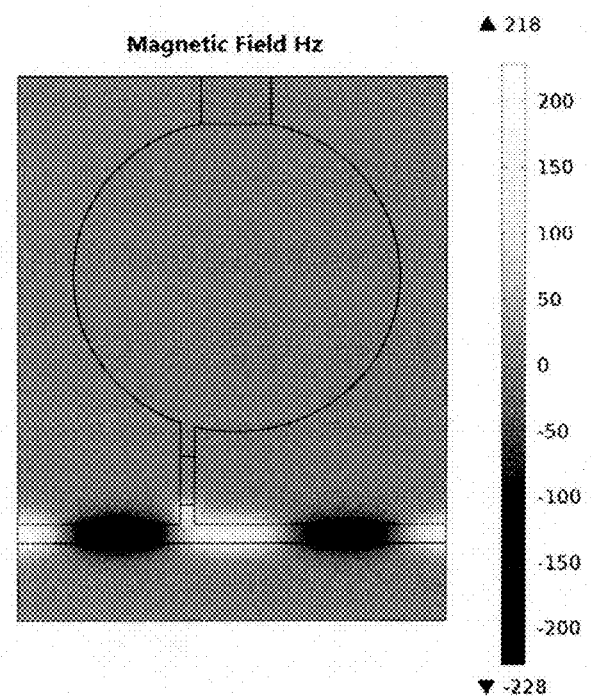
FIG. 9 shows a signal light-field distribution diagram of a terahertz wave input power of 3.0 nW in embodiment 1.

In at least embodiment 4, the incident terahertz intensity is 3.0 nW; using the structures of FIGS. 1 and 2, the 2D structure is numerically verified and numerical simulations is obtain for the light field distribution shown in FIG. 9.

Figure 10:
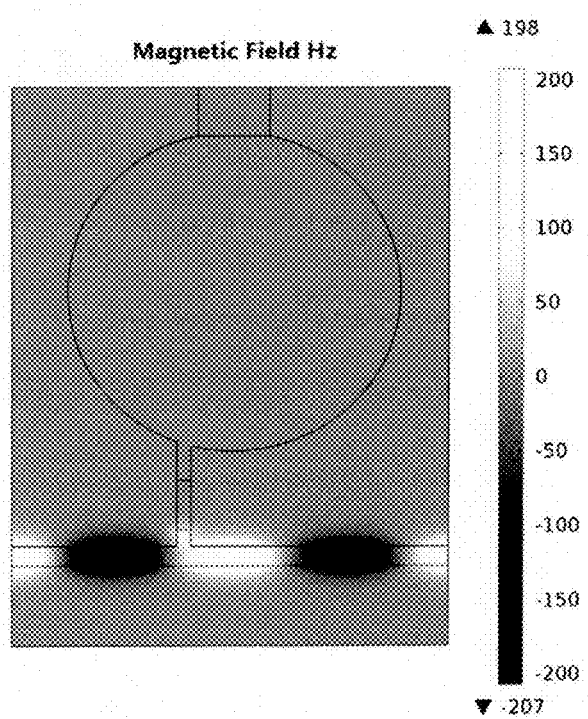
FIG. 10 shows a signal light-field distribution diagram of a terahertz wave input power of 3.6 nW in embodiment 1.

In at least embodiment 5, the incident terahertz intensity is 3.6 nW; using the structures of FIGS. 1 and 2, the 2D structure is numerically verified and numerical simulations is obtain for the light field distribution shown in FIG. 10.

Figure 11:
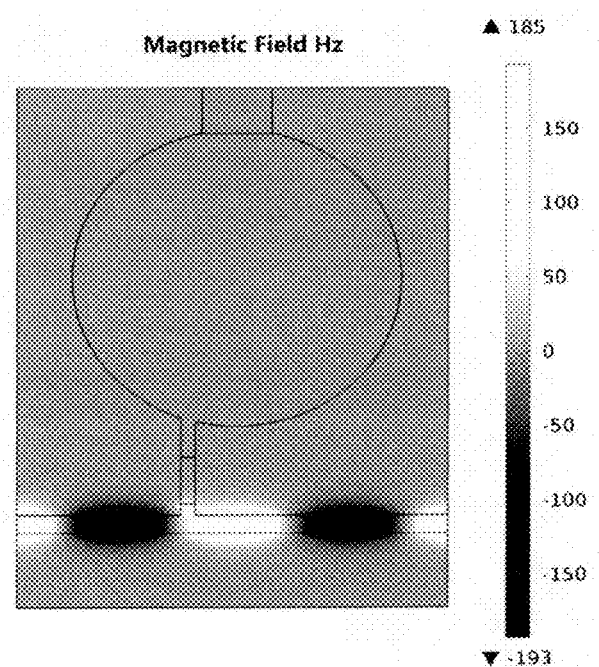
FIG. 11 shows a signal light-field distribution diagram of a terahertz wave input power of 4.2 nW in embodiment 1.

In at least embodiment 6, the incident terahertz intensity is 4.2 nW; using the structures of FIGS. 1 and 2, the 2D structure is numerically verified and numerical simulations is obtain for the light field distribution shown in FIG. 11.

Figure 12:
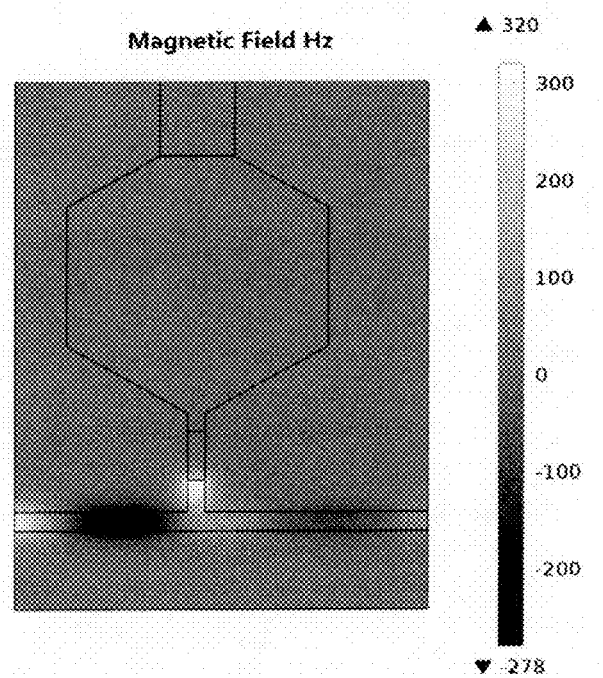
FIG. 12 shows a signal light-field distribution diagram of a terahertz wave input power of 1.2 nW in embodiment 2.

In at least embodiment 7, the incident terahertz intensity is 1.2 nW; using the structures of FIGS. 3 and 4, the 2D structure is numerically verified and numerical simulations is obtain for the light field distribution shown in FIG. 12.

Figure 13:
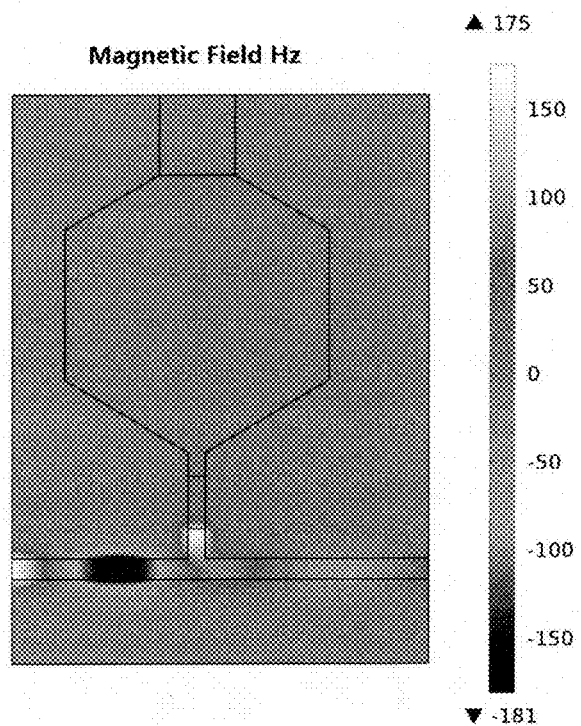
FIG. 13 shows a signal light-field distribution diagram of a terahertz wave input power of 1.8 nW in embodiment 2.

In at least embodiment 8, the incident terahertz intensity is 1.8 nW; using the structures shown in FIGS. 3 and 4, the 2D structure is numerically verified and numerical simulations is obtain for the light field distribution shown in FIG. 13.

Figure 14:
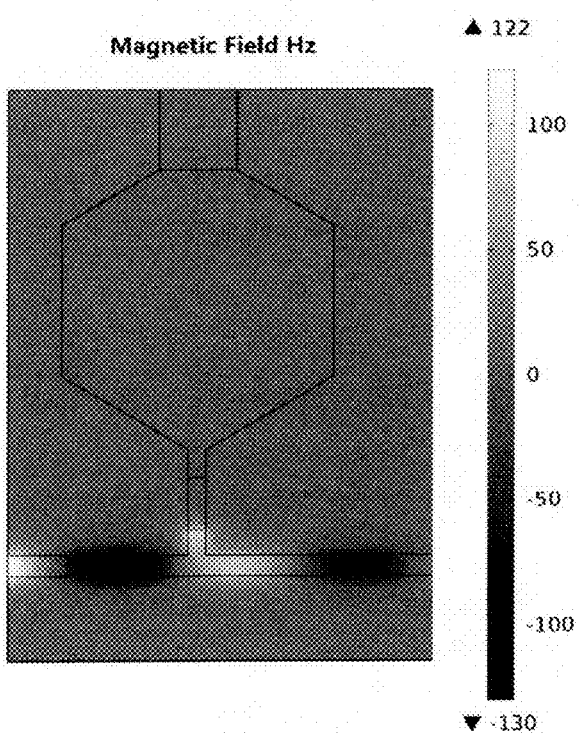
FIG. 14 shows a signal light-field distribution diagram of a terahertz wave input power of 2.4 nW in embodiment 2.

In at least embodiment 9, the incident terahertz intensity is 2.4 nW; using the structures of FIGS. 3 and 4, the 2D structure is numerically verified and numerical simulations is obtain for the light field distribution shown in FIG. 14.

Figure 15:
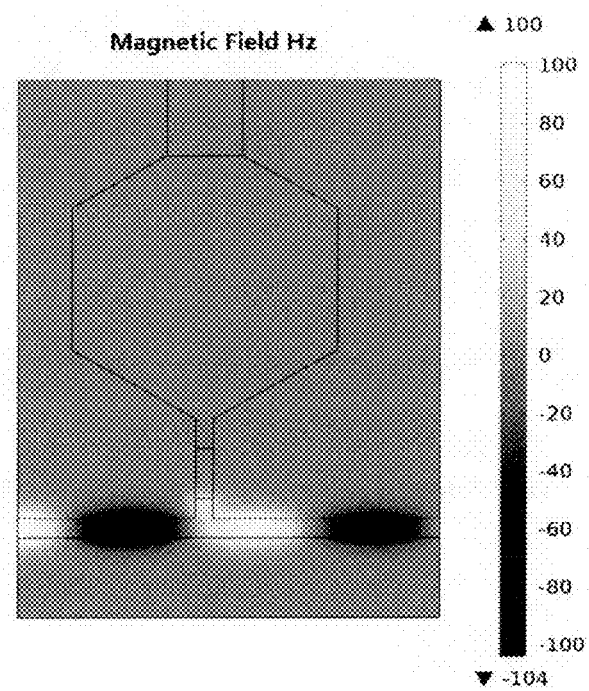
FIG. 15 shows a signal light-field distribution diagram of a terahertz wave input power of 3.0 nW in embodiment 2.

In at least embodiment 10, the incident terahertz intensity is 3.0 nW; using the structures of FIGS. 3 and 4, the 2D structure is numerically verified and numerical simulations is obtain for the light field distribution shown in FIG. 15.

Figure 16:
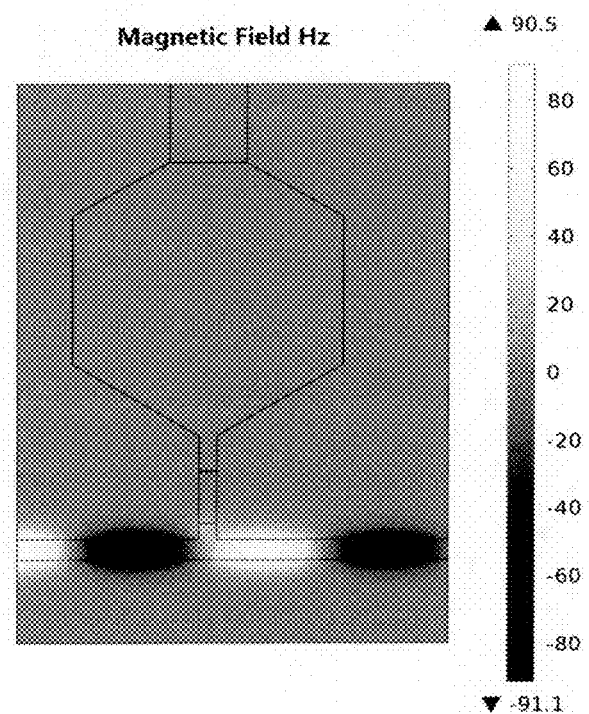
FIG. 16 shows a signal light-field distribution diagram of a terahertz wave input power of 3.6 nW in embodiment 2.

In at least embodiment 11, the incident terahertz intensity is 3.6 nW; using the structures of FIGS. 3 and 4, the 2D structure is numerically verified and numerical simulations is obtain for the light field distribution shown in FIG. 16.

Figure 17:
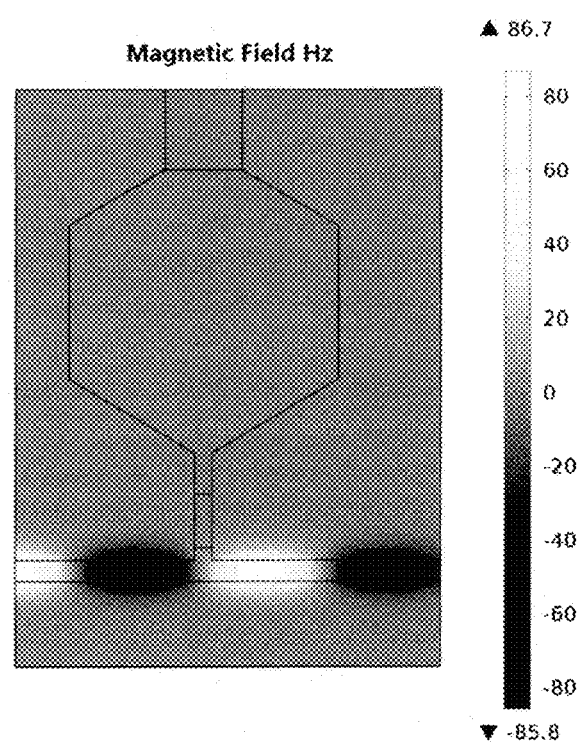
FIG. 17 shows a signal light-field distribution diagram of a terahertz wave input power of 4.2 nW in embodiment 2.

In at least embodiment 12, the incident terahertz intensity is 4.2 nW; using the structures of FIGS. 3 and 4, the 2D structure is numerically verified and numerical simulations is obtain for the light field distribution shown in FIG. 17.

While the disclosure has been described in terms of various specific embodiments, those skilled in the art will recognize that the disclosure is practiced with modification within the spirit and scope of the claims.

What is claimed is:

1. A metal-insulator-metal (MIM) high-sensitivity surface plasmon polariton (SPP) terahertz wave detector, comprising:
   a rectangular cavity, an absorption cavity, a silver block, two waveguides, three metal films, a terahertz probe wave, a SPP and an opto-electric detector; the an incident end of the terahertz probe wave is located at an upper end of the rectangular cavity; the rectangular cavity is located at an input end of the terahertz probe wave; a first and a second waveguide are MIM waveguide structures, and the first waveguide is connected with a second waveguide, the absorption cavity is connected with the first waveguide; the silver block is disposed within the first waveguide, and is movable; a time for the terahertz wave detector to absorb the terahertz probe wave in the absorption cavity is 1 ms, and a detection intensity of the terahertz probe wave is 0.6 nw-6 nw.

2. The MIM high-sensitivity SPP terahertz wave detector of claim 1, wherein a shape of the absorption cavity is a rectangle, a circle, a polygon, an ellipse, a combination of a rectangle and a circle, a combinations of a rectangle and a polygon, a combination of a rectangles with ellipses, a combination of a circles and a polygons, a combination of a circles and an ellipses, or a combination of a polygons and an ellipses.

3. The MIM high-sensitivity SPP terahertz wave detector of claim 1, wherein inside the rectangular cavity is a high transmittance material.

4. The MIM high-sensitivity SPP terahertz wave detector of claim 1, wherein inside the rectangular cavity is silicon (Si), germanium, or gallium arsenide.

5. The MIM high-sensitivity SPP terahertz wave detector of claim 1, wherein inside the absorption cavity is a high thermal-expansion-coefficient material.

6. The MIM high-sensitivity SPP terahertz wave detector of claim 1, wherein inside the absorption cavity is ethanol, or mercury.

7. The MIM high-sensitivity SPP terahertz wave detector of claim 1, wherein the MIM forms a waveguide structure.

8. The MIM high-sensitivity SPP terahertz wave detector of claim 1, wherein the silver block is gold, or silver.

9. The MINI high-sensitivity SPP terahertz wave detector of claim 8, wherein the silver block is silver.

10. The MEM high-sensitivity SPP terahertz wave detector of claim 1, wherein the insulator is a transparent material.

11. The MIM high-sensitivity SPP terahertz wave detector of claim 1, wherein the insulator is air, silicon dioxide, or Si.

12. The MIM high-sensitivity SPP terahertz wave detector of claim 1, wherein the SPP has an operating wavelength of 780 nm, the terahertz probe wave has a wavelength of 3 μm, and has a strength of 1.2 to 4.2 nw.

13. The MIM high-sensitivity SPP terahertz wave detector of claim 1, wherein the opto-electric detector is located at an output port of the second waveguide.

14. The MIM high-sensitivity SPP terahertz wave detector of claim 1, wherein the opto-electric detector is made of Si.

* * * * *